(12) United States Patent
Sasaki et al.

(10) Patent No.: US 7,276,817 B2
(45) Date of Patent: Oct. 2, 2007

(54) OUTPUT VOLTAGE CONTROL APPARATUS FOR VEHICULAR AC GENERATOR

(75) Inventors: Junya Sasaki, Tokyo (JP); Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 53 days.

(21) Appl. No.: 11/350,013

(22) Filed: Feb. 9, 2006

(65) Prior Publication Data

US 2007/0046101 A1 Mar. 1, 2007

(30) Foreign Application Priority Data

Aug. 24, 2005 (JP) .......................... P2005-242662

(51) Int. Cl.
*H02J 3/46* (2006.01)
*H02H 7/06* (2006.01)
(52) U.S. Cl. ........................................ 307/153; 322/28
(58) Field of Classification Search ................. 322/28, 322/27, 36; 307/153
See application file for complete search history.

(56) References Cited

U.S. PATENT DOCUMENTS

| 4,388,586 | A | 6/1983 | Lamoth |
| 6,696,773 | B2* | 2/2004 | Taniguchi .................. 307/153 |
| 7,075,272 | B2* | 7/2006 | Sasaki et al. ................. 322/28 |

FOREIGN PATENT DOCUMENTS

JP 2002-369596 A 12/2002

* cited by examiner

*Primary Examiner*—Shawn Riley
(74) *Attorney, Agent, or Firm*—Sughrue Mion Pllc.

(57) ABSTRACT

There is provided an output voltage control apparatus for a vehicular AC generator in which a generator output voltage including a ripple component can be made to more approach a reference voltage. The control apparatus includes a comparison circuit to compare a detection voltage including a ripple component with a reference voltage and to output an effective comparison output in each of low output sections in which the detection voltage is lower than the reference voltage by the ripple component, an on period counter to count up, in a count enable period set in each of the control periods, a count value while adding the count value in each of the low output sections based on the effective comparison output, and a memory circuit to store a final count value in the count enable period in each of the control periods.

8 Claims, 6 Drawing Sheets

OUTPUT VOLTAGE CONTROL APPARATUS FOR VEHICULAR AC GENERATOR

BACKGROUND OF THE INVENTION

1. Field of the Invention

The present invention relates to an output voltage control apparatus for a vehicular AC generator mounted on a vehicle such as an automobile.

2. Description of the Related Art

Since a vehicular AC generator is driven by an engine mounted on a vehicle, when a control is not performed, the output voltage of the generator varies according to the engine speed. In order to control the generator output voltage within a specified voltage range even in the case where the engine speed is increased, an output voltage control apparatus is used. As the output voltage control apparatus for the vehicular AC generator, a fixed frequency type output control apparatus is disclosed in, for example, U.S. Pat. No. 4,388,586. This fixed frequency type output voltage control apparatus repeats a control period of a specified time width, controls an ON period of a field current of an AC generator in each of control periods, and adjusts a generator output voltage.

The fixed frequency type voltage control apparatus includes, for example, a flip-flop, a voltage detection circuit, and a comparison circuit. The flip-flop starts the ON period of the field current at a start time point of each of the control periods of the specified time width. The voltage detection circuit outputs a detection voltage corresponding to the generator output voltage. The comparison circuit compares the detection voltage with a reference voltage, and performs the control so that when the detection voltage is lower than the reference voltage in each of the control periods, the flip-flop continues the ON period, and at the time point when the detection voltage becomes higher than the reference voltage, the flip-flop is inverted and the ON period is ended. Since the fixed frequency type output voltage control apparatus controls the field current in synchronization with each of the control periods of the specified time width, there is a merit that the control can be easily made by, for example, a microcomputer.

Since the vehicular AC generator is provided with a rectifier unit to convert the AC output voltage into DC voltage, the generator output voltage obtained at the output side of the rectifier unit includes a ripple component due to the rectification operation of the rectifier unit. Since the voltage detection circuit is also connected to the output side of the rectifier unit, the detection voltage outputted by the voltage detection circuit also includes a ripple component. In the detection voltage including the ripple component, since the ripple component brings an effect of increasing the instantaneous value of the detection voltage, and consequently, the ON period is controlled to be short, the generator output voltage is controlled to be a relatively low value with respect to the reference voltage, and there arises a disadvantage that the voltage value of the generator output voltage can not be made sufficiently large.

SUMMARY OF THE INVENTION

The present invention improves the disadvantage as stated above and provides an output voltage control apparatus for a vehicular AC generator in which, while a detection voltage including a ripple component is used, a generator output voltage with a small deviation from a reference voltage can be obtained.

According to an aspect of the invention, an output voltage control apparatus for a vehicular AC generator having a rectifier unit to rectify an AC output voltage, and to output a generator output voltage including a ripple component from the rectifier unit, includes a control unit that repeats a control period of a specified time width, and performs a control to supply a field current to the vehicular AC generator in an ON period of a controlled time width in each of the control periods. The control unit includes a voltage detection circuit, a comparison cirvuit, an ON period counter, and a memory. The voltage detection circuit detects the generator output voltage and outputs a detection voltage including a ripple component. The comparison circuit compares the detection voltage including the ripple component with a reference voltage and outputs an effective comparison output in each of low output sections in which the detection voltage is lower than the reference voltage depends on the ripple component. The ON period counter counts up, in a count enable period set in each of the control periods, a count value while adding the count value in each of the low output sections based on the effective comparison output. The memory circuit stores a final count value in the count enable period in each of the control periods. The control unit determines, based on the final count value in each of the control periods, the ON period of the controlled time width in the next control period.

Since the output voltage control apparatus for the vehicular AC generator according to the invention includes the comparison circuit to compare the detection voltage including the ripple component with the reference voltage and to output the effective comparison output in each of the low output sections in which the detection voltage is lower than the reference voltage by the ripple component, the ON period counter to count up, in the count enable period set in each of the control periods, the count value while adding the count value in each of the low output sections based on the effective comparison output, and the memory circuit to store the final count value in the count enable period in each of the control periods, and accordingly, the count value of the ON period counter can be counted up in each of the low output sections, the detection voltage is controlled to more approach the reference voltage, and the generator output voltage with a small deviation from the reference voltage can be obtained.

BRIEF DESCRIPTION OF THE DRAWINGS

FIGS. 6(a) and 6(b) are waveform views showing a reference voltage used in embodiment 3 of an output voltage control apparatus for a vehicular AC generator according to the invention and an operation by that.

FIGS. 7(a) and 7(b) are waveform views showing a reference voltage used in embodiment 4 of an output voltage control apparatus for a vehicular AC generator according to the invention and an operation by that.

DETAILED DESCRIPTION OF THE INVENTION

Hereinafter, some embodiments of the invention will be described with reference to the drawings.

EMBODIMENT 1

Figure 1:
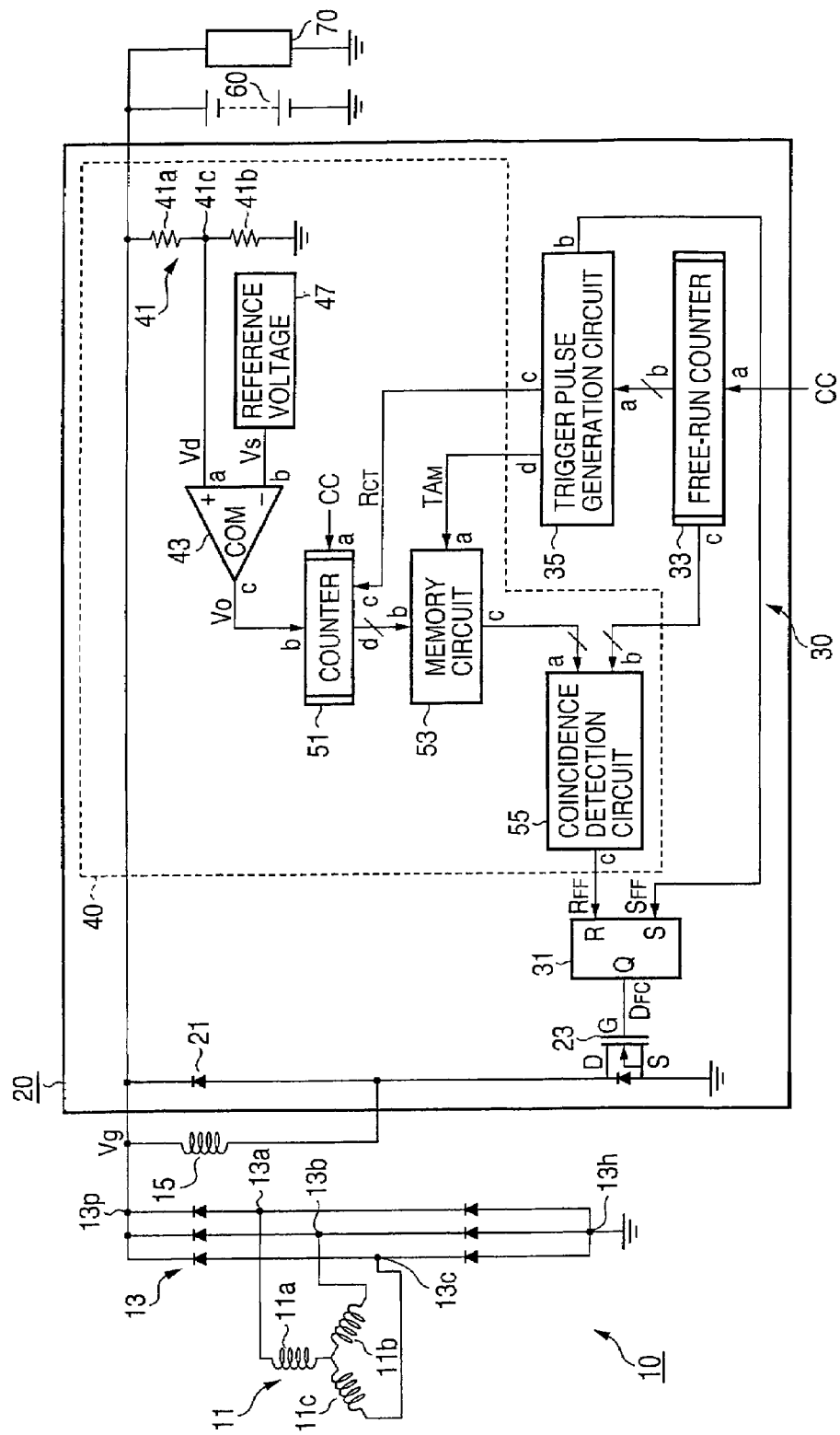
FIG. 1 is an electric circuit diagram showing embodiment 1 of an output voltage control apparatus for a vehicular AC generator according to the invention.
Figure 2:
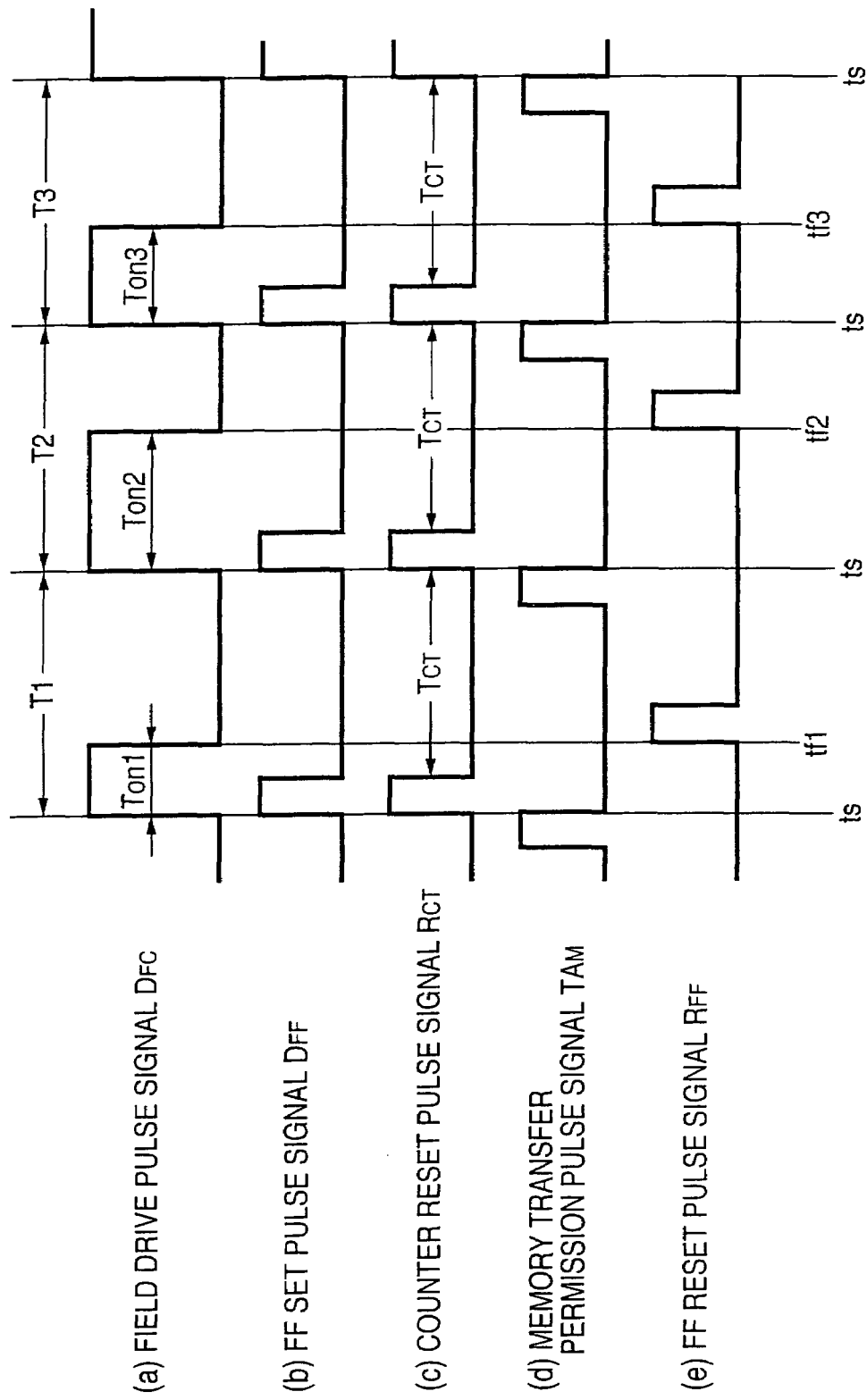
FIGS. 2(a) to 2(e) are waveform views showing pulse signal waveforms of respective portions of embodiment 1.
Figure 3:
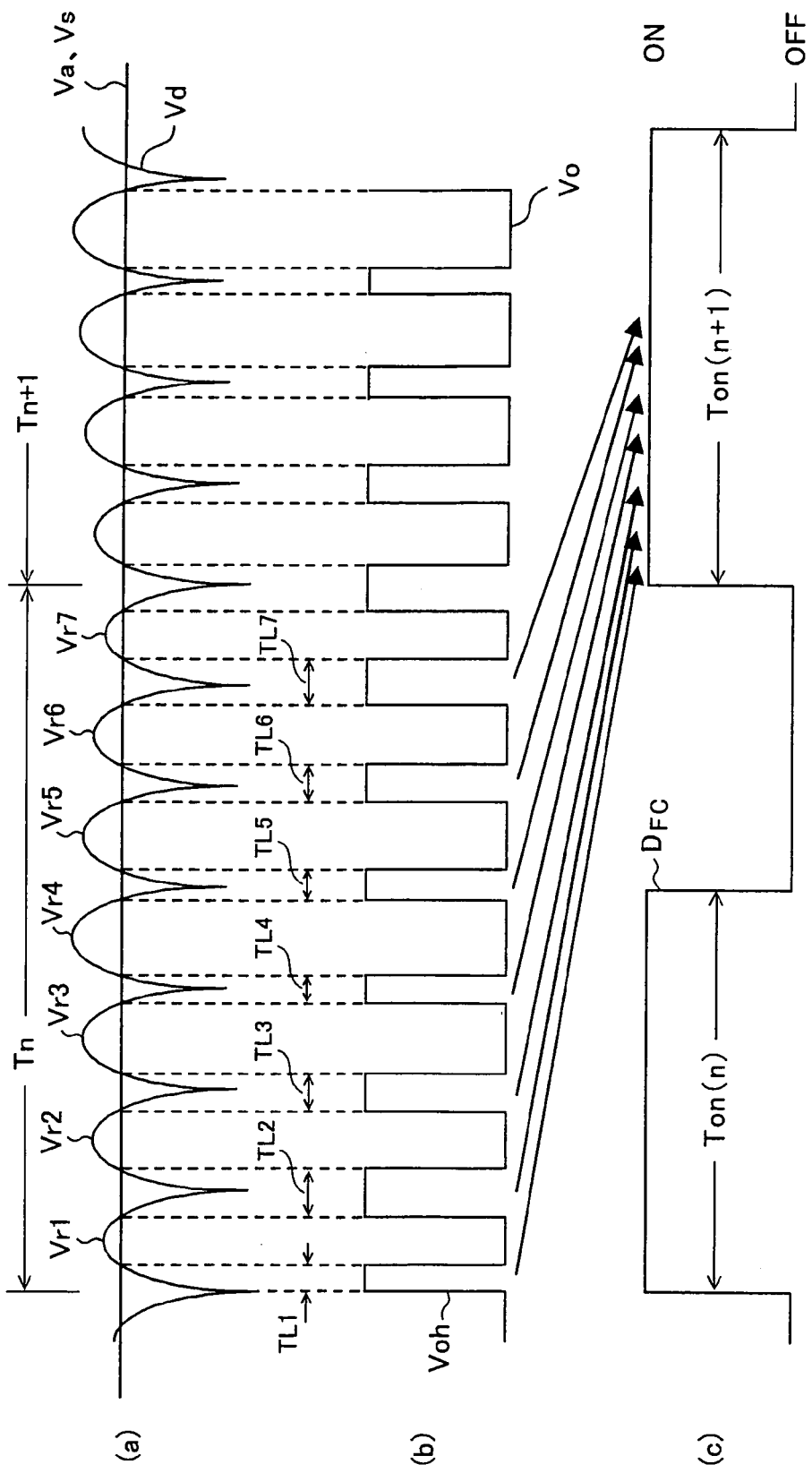
FIGS. 3(a) to 3(c) are waveform views showing a count operation of an on period counter and an on period control operation by that in embodiment 1.

FIG. 1 is an electric circuit diagram showing embodiment 1 of an output voltage control apparatus for a vehicular AC generator according to the invention. FIGS. 2(a) to 2(e) are waveform views showing pulse signal waveforms of respective portions of embodiment 1. FIGS. 3(a) to 3(c) are waveform views showing a count operation of an ON period counter and an ON period control operation based on that in embodiment 1.

As shown in FIG. 1, the output voltage control apparatus for the vehicular AC generator according to embodiment 1 includes a vehicular AC generator 10, a control unit 20, an on-board battery 60, and a vehicle electric load 70. The vehicular AC generator 10 includes an armature coil 11, a rectifier unit 13, and a field coil 15. This vehicular AC generator 10 is, for example, a rotating-field type AC generator, a rotator having the field coil 15 is driven by an engine mounted on a vehicle, and an AC voltage is generated in the armature coil 11 based on the rotation of the rotator.

The armature coil 11 is a three-phase armature coil, and includes armature coils 11a, 11b and 11c of respective phases of three phases, and these armature coils 11a, 11b and 11c are star-connected. The rectifier unit 13 is a three-phase full-wave rectifier unit attached to the vehicular AC generator 10, is constructed of three positive side diodes and three negative side diodes, and has three AC input terminals 13a, 13b and 13c and a pair of DC output terminals 13p and 13n. The respective AC input terminals 13a, 13b and 13c are connected to the armature coils 11a, 11b and 11c of the respective phases. A generator output voltage Vg is outputted between the pair of DC output terminals 13p and 13n. The output terminal 13n is connected to a reference potential point.

The rectifier unit 13 three-phase full-wave rectifies three-phase AC voltages generated in the armature coils 11a, 11b and 11c of the respective phases. The generator output voltage Vg is a DC voltage while the DC output terminal 13p is a positive terminal and the DC output terminal 13n is a negative terminal, and it includes a ripple component Vr. The ripple component Vr is generated because the three-phase AC voltage is full-wave rectified.

The field coil 15, the control unit 20, the on-board battery 60, and the vehicle electric load 70 are connected to the DC output terminals 13p and 13n. The generator output voltage Vg is adjusted within a specified voltage value range by the control unit 20, and is supplied to the field coil 15, the on-board battery 60 and the vehicle electric load 70. The on-board battery 60 is charged by the generator output voltage Vg. The field coil 15 is excited by the on-board battery 60 or the generator output voltage Vg. The vehicle electric load 70 includes an igniter attached to the engine, a lamp, an air conditioner and the like and is fed by the on-board battery 60 or the generator output voltage Vg.

The control unit 20 is a voltage control unit to control the generator output voltage Vg, and includes a reflux diode 21, a field control transistor 23, and a control circuit 30. The reflux diode 21 is connected in parallel to the field coil 15.

The field control transistor 23 is connected in series to the field coil 15, and ON/OFF controls the field current flowing through the field coil 15 to adjust the generator output voltage Vg. The field control transistor 23 is constructed of, for example, an insulated gate bipolar transistor (IGBT) or a power bipolar transistor. In embodiment 1 of FIG. 1, the IGBT having a source S, a drain D and a gate G is used. The source S is connected to the reference potential point, and the drain D is connected to the field coil 15.

The control circuit 30 is a fixed frequency type output voltage control circuit. This control circuit 30 includes a flip-flop 31, a free-run counter 33, a trigger pulse generation circuit 35, and an ON period control circuit 40. The flip-flop 31 is, for example, an RS flip-flop, and has an output Q, a set input S and a reset input R. The output Q of the flip-flop 31 is connected to the gate G of the field control transistor 23, and a field drive pulse signal $D_{FC}$ is supplied from the output Q to the gate G of the field control transistor 23.

An FF set pulse signal $S_{FF}$ is inputted to the set input S of the flip-flop 31, and an FF reset pulse signal $R_{FF}$ is inputted to the reset input R. In this flip-flop 31, when the set pulse signal $S_{FF}$ becomes high level, the field drive pulse signal $D_{FC}$ of the output Q becomes high level, and the field control transistor 23 is ON-operated. When the FF reset pulse signal $R_{FF}$ becomes high level, the field drive pulse signal $D_{FC}$ of the output Q becomes low level, and the field control transistor 23 is OFF-operated.

FIGS. 2(a) to 2(e) show pulse signal waveforms in respective portions of embodiment 1 shown in FIG. 1. FIG. 2(a) shows the field drive pulse signal $D_{FC}$ outputted to the field control transistor 23 from the flip-flop 31, FIG. 2(b) shows the FF set pulse signal $S_{FF}$ outputted from the trigger pulse generation circuit 35 to the flip-flop 31, FIG. 2(c) shows a counter reset pulse signal $R_{CT}$ outputted from the trigger pulse generation circuit 35 to the ON period control circuit 40, FIG. 2(d) shows a memory transfer permission pulse signal $TA_M$ outputted from the trigger pulse generation circuit 35 to the ON period control circuit 40, and FIG. 2(e) shows the FF reset pulse signal $R_{FF}$ outputted from the ON period control circuit 40 to the flip-flop 31.

The field drive pulse signal $D_{FC}$ shown in FIG. 2(a) gives plural control periods T1, T2, T3, . . . to the control unit 20. These control periods T1, T2, T3, . . . mutually have the same time width T0, and are repeatedly and continuously given. The field drive pulse signal $D_{FC}$ becomes high level at a start time point ts of each of the control periods T1, T2, T3, . . . , and starts an ON period Ton1, Ton2, Ton3, . . . . The field drive pulse signal $D_{FC}$ keeps the high level in the controlled ON period Ton1, Ton2, Ton3 . . . in each of the control periods T1, T2, T3, . . . , and returns to the low level at an end time point tf1, tf2, tf3, . . . of each of the ON periods Ton1, Ton2, Ton3, . . . . Since all the control periods T1, T2, T3, . . . have the same time width T0, the control unit 20 constitutes a fixed frequency type control unit. Time widths of the ON periods Ton1, Ton2, Ton3, . . . are determined by the ON period control circuit 40.

The free-run counter 33 has one input "a" and two outputs "b" and "c". The input "a" is a clock input, and a clock signal CC is inputted to this input "a". Both the outputs "b" and "c" output a count value $CT_F$ of the free-run counter 33. The free-run counter 33 is constructed such that it is reset at the start time point ts of each of the control periods T1, T2, T3, . . . , and the clock signal CC is counted up in each of the control periods T1, T2, T3, . . . .

The trigger pulse generation circuit 35 includes one input "a" and three outputs "b", "c" and "d". The input "a" of the trigger pulse generation circuit 35 is connected to the output "b" of the free-run counter 33 through a plural-bit connection line. The count value $CT_F$ of the free-run counter 33 is inputted to the input "a" of the trigger pulse generation circuit 35. The trigger pulse generation circuit 35 generates the FF set pulse signal $S_{FF}$ at the output "b" based on the count value $CT_F$, generates the counter reset pulse signal $R_{CT}$ at the output "c", and generates the memory transfer permission pulse signal $TA_M$ at the output "d".

The FF set pulse signal $S_{FF}$ becomes high level each time the free-run counter 33 is reset and the count value $CT_F$ is reset to 0. The FF set pulse signal $S_{FF}$ becomes, as shown in FIG. 2(b), the high level at the start time point ts of each of the control periods T1, T2, T3, . . . . Accordingly, the flip-flop 31 receives the FF set pulse signal $S_{FF}$ at the start time point ts of each of the control periods T1, T2, T3, . . . , and ON-operates the field control transistor 23.

The counter reset pulse signal $R_{CT}$ is a signal synchronous with, for example, the FF set pulse signal $S_{FF}$. The counter reset pulse signal $R_{CT}$ also becomes high level each time the free-run counter 33 is rest and the counter value $CT_F$ is reset to 0. The counter reset pulse signal $R_{CT}$ also becomes, as shown in FIG. 2(c), the high level at the start time point ts of each of the control periods T1, T2, T3, . . . . Incidentally, the time point when the counter reset pulse signal $R_{CT}$ becomes the high level can be somewhat shifted from the position of FIG. 2 (c). It is necessary that the counter reset pulse signal $R_{CT}$ rises to the high level after the memory transfer permission pulse signal $TA_M$ shown in FIG. 2(d) rises to the high level.

Since the free-run counter 33 counts up the clock signal CC in the period from the start time point ts, at which it is reset, of each of the control periods T1, T2, T3 . . . to the start time point ts of the next control period at which it is reset, the count value $CT_F$ reaches the maximum value at the end of each of the control periods T1, T2, T3 . . . before it is reset at the start time point ts of each of the control periods T1, T2, T3 . . . . The memory transfer permission pulse signal $TA_M$ becomes, as shown in FIG. 2D, high level at the end of each of the control periods T1, T2, T3 . . . each time the count value $CT_F$ of the free-run counter 33 reaches the maximum value.

The ON period control circuit 40 determines the ON periods Ton1, Ton2, Ton3, . . . of the controlled time widths in the respective control periods T1, T2, T3, . . . . The ON period control circuit 40 gives the FF reset pulse signal $R_{FF}$ to the reset input R of the flip-flop 31 at a time point tf1, tf2, tf3 . . . when the ON period Ton1, Ton2, Ton3, . . . has passed since the start time point ts of each of the control periods T1, T2, T3, . . . , resets the flip-flop 31, and OFF-operates the field control transistor 23.

The ON period control circuit 40 includes a voltage detection circuit 41, a comparison circuit 43, a reference voltage circuit 47, an ON period counter 51, a memory circuit 53, and a coincidence detection circuit 55. The voltage detection circuit 41 is connected between the DC output terminals 13p and 13n, and detects the generator output voltage Vg. This voltage detection circuit 41 is a resistive potential divider circuit including two series-connected resistors 41a and 41b, and outputs a detection voltage Vd in proportion to the generator output voltage Vg from an output point 41c between the resistors 41a and 41b. Since the generator output voltage Vg includes the ripple component Vr, the detection voltage Vd also includes the ripple component Vr.

The comparison circuit 43 has a plus input "a", a minus input "b" and an output "c". The detection voltage Vd is inputted to the plus input "a". The reference voltage circuit 47 generates a reference voltage Vs, and supplies this reference voltage Vs to the minus input "b" of the comparison circuit 43. The reference voltage Vs is a control target voltage of the generator output voltage Vg, and the ON period control circuit 40 controls the time widths of the ON periods Ton1, Ton2, Ton3, . . . in the respective control periods T1, T2, T3 . . . , so that an average value of the detection voltage Vd approaches the reference voltage Vs. This reference voltage Vs is made a constant voltage keeping a specific reference voltage value in embodiment 1. The comparison circuit 43 compares the detection voltage Vd with the reference voltage Vs, and generates a comparison output Vo at the output "c". This comparison output Vo becomes high level in a low output state where the detection voltage Vd is lower than the reference voltage Vs, and becomes low level in a high output state where the detection voltage Vd is higher than the reference voltage Vs. The comparison output Vo of the high level is called an effective comparison output Voh.

When the rotation speed of the engine to drive the AC generator 10 is increased, the generator output voltage Vg rises according to that, and the detection voltage Vd rises to the reference voltage Vs. In the rising process of this detection voltage Vd, in a state where the detection voltage Vd including the ripple component Vr is the reference voltage Vs or lower, and the ripple component Vr of the detection voltage Vd does not cross the reference voltage Vs, there always occurs the low output state, the detection voltage Vd is always lower than the reference voltage Vs, and the comparison output Vo is always the effective comparison output Voh.

When the detection voltage Vd rises and approaches the reference voltage Vs, and the ripple component Vr of the detection voltage Vd crosses the reference voltage Vs there occurs a state where plural ripple waveforms of the ripple component Vr cross the reference voltage Vs. In this state, plural low output sections where the detection voltage Vd becomes lower than the reference voltage Vs intermittently occur due to the ripple component Vr, and the effective comparison output Voh is generated in the respective low output sections.

The ON period counter 51 has three inputs "a", "b" and "c" and one output "d". The input "a" is a clock input, and a clock signal CC is inputted to the input "a". The clock signal CC is the same clock signal as the clock signal CC inputted to the input "a" of the free-run counter 33. The input "b" is a count up permission input of the ON period counter 51. This input "b" is connected to the output "c" of the comparison circuit 43, and the comparison output Vo from the comparison circuit 43 is inputted to this input "b". The input "c" is a reset input. This input "c" is connected to the output "c" of the trigger pulse generation circuit 35, and the counter reset pulse signal $R_{CT}$ is inputted to this input "c" from the trigger pulse generation circuit 35.

This ON period counter 51 has, as shown in FIG. 2(c), a count enable period $T_{CT}$ in a period in which the counter reset pulse signal $R_{CT}$ keeps the low level. This count enable period $T_{CT}$ is set in each of the control periods T1, T2, T3, . . . . This count enable period $T_{CT}$ is, as shown in FIG. 2(c), the period from a time when the counter reset pulse signal $R_{CT}$ becomes high level and the ON period counter 51 is reset to a time when the counter reset pulse next becomes high level and the ON period counter 51 is again reset. The ON period counter 51 counts up, in the count enable period $T_{CT}$, the clock signal CC based on the effective comparison output Voh from the comparison circuit 43 and in a period when the effective comparison output Voh is outputted. A count value CTon of the ON period counter 51 reaches a final count value FCTon at the end of each of the control periods T1, T2, T3, . . . . This final count value FCTon is proportional to the time width in which the effective comparison output Voh is outputted. In the case where plural low output sections are given in the count enable period $T_{CT}$, since the ON period counter 51 counts up the count value CTon while adding the count value CTon in each of the low output sections, the final count value FCTon of the ON period counter 51 is proportional to an integral value of the time widths of the low output sections.

The memory circuit 53 has two inputs "a" and "b" and one output "c". The input "a" is a memory transfer permission pulse input. The input "a" of the memory circuit 53 is connected to the output "d" of the trigger pulse generation circuit 35, and the memory transfer permission pulse signal $TA_M$ is inputted to the input "a" of the memory circuit 53. The input "b" is a data input of the memory. The input "b" of the memory circuit 53 is connected to the output "d" of the ON period counter 51 through a plural-bit connection line, and the count value CTon of the ON period counter 51 is given to the input "b" of the memory circuit 53. The output "c" is a data output of the memory. When the memory transfer permission pulse signal $TA_M$ becomes high level, the memory circuit 53 reads and stores the final count value FCTon from the ON period counter 51, and outputs the final count value FCTon from the output "c".

The memory transfer permission pulse signal $TA_M$ becomes, as shown in FIG. 2(d), high level at the end of each of the control periods T1, T2, T3, . . . , and causes the memory circuit 53 to store the final count value FCTon from the ON period counter 51. The ON period counter 51 is reset, as shown in FIG. 2(c), when the counter reset pulse signal $R_{CT}$ becomes high level after the memory transfer permission pulse signal $TA_M$ becomes high level. However, the final count value FCTon stored in the memory circuit 53 is held in the next control period. Specifically, for example, the final count value FCTon transferred to the memory circuit 53 at the end of the control period T1 is held in the memory circuit 53 in the next control period T2, and is used to determine the ON period Ton2 of this control period T2. Similarly, for example, the final count value FCTon transferred to the memory circuit 53 in the control period T2 is held in the memory circuit 53 in the next control period T3, and is used to determine the ON period Ton3 of the control period T3. The ON period Ton1 in the control period T1 is determined by the final count value FCTon of the ON period counter 51 in the control period TN before the control period T1.

The coincidence detection circuit 55 has two inputs "a" and "b" and one output "c". The input "a" of the coincidence detection circuit 55 is connected to the output "c" of the memory circuit 53 through a bit connection line, and the final count value FCTon is inputted to the input "a" of the coincidence detection circuit 55. The input "b" of the coincidence detection circuit 55 is connected to the output "c" of the free-run counter 33 through a bit connection line, and the count value $CT_F$ of the free-run counter 33 is inputted to the input "b" of the coincidence detection circuit 55. The output "c" of the coincidence detection circuit 55 is connected to the reset input R of the flip-flop 31, and supplies the FF reset pulse signal $R_{FF}$ shown in FIG. 2(e) to the flip-flop 31.

The coincidence detection circuit 55 changes the FF reset pulse signal $R_{FF}$ of the output "c" to the high level when the count value $CT_F$ of the free-run counter 33 given to the input "b" is coincident with the final count value FCTon given to the input "a", and resets the flip-flop 31.

The count operation of the ON period counter 51 in the ON period control circuit 40 and the determination operation of the ON period Ton1, Ton2, Ton3 . . . based on that will be described with reference to FIGS. 3(a) to 3(c). FIG. 3(a) is a waveform view exemplifying a relation between the detection voltage Vd and the reference voltage Vs with respect to two continuous control periods Tn and Tn+1 (n is an arbitrary positive integer). The control periods Tn and Tn+1 are control periods typifying the control periods T1, T2, T3, . . . , and those time widths are T0 and are equal to one another. FIG. 3(a) specifically exemplifies an ideal state in which an average value Va of the detection voltage Vd including the ripple component Vr is equal to the reference voltage Vs. FIG. 3(b) shows the comparison output Vo in the case where the detection voltage Vd of FIG. 3(a) is inputted to the plus input "a" of the comparison circuit 43, and FIG. 3(c) shows a relation between the comparison output Vo shown in FIG. 3(b) and the ON period Ton(n+1) of the control period Tn+1.

The ripple component Vr of the detection voltage Vd exemplified in FIG. 3(a) includes seven ripple waveforms Vr1 to Vr7 in the control period Tn. It is assumed that the peak values of the ripple waveforms Vr1 to Vr7 are gradually increased from the ripple waveform Vr1 to the ripple waveform Vr4, becomes maximum at the ripple waveform Vr4, and are gradually decreased from the ripple waveform Vr4 to the ripple waveform Vr7. The change of the peak values from the ripple waveform Vr1 to Vr7 depends on the time constant of the field circuit including the field coil 15 of the AC generator 10. Specifically, the peak values of the ripple waveforms Vr1 to Vr7 are changed dependently on the field current flowing through the field coil 15, which increases in accordance with the time constant of the field circuit after the ON period Ton(n) starts and decreases in accordance with the time constant of the field circuit after the ON period Ton(n) is ended.

In the waveform shown in FIG. 3(a), since the ripple waveforms Vr1 to Vr7 cross the reference voltage Vs, seven low output sections TL1 to TL7 intermittently appear in the control period Tn. In the low output sections TL1 to TL7, since the detection voltage Vd is lower than the reference voltage Vs, as shown in FIG. 3(b), the comparison output Vo becomes high level in the low output sections TL1 to TL7, and becomes the effective comparison output Voh. The ON period counter 51 counts up the clock signal CC in the respective low output sections TL1 to TL7 based on the effective comparison output Voh. The count value CTon(n) of the ON period counter 51 in the control period Tn is counted up while the count value is added in the respective low output sections TL1 to TL7, and the final count value FCTon(n) is resultantly proportional to an integral value of the continuation times of the respective low output sections TL1 to TL7.

This final count value FCTon(n) is transferred to the memory circuit 53 and is stored when the memory transfer permission pulse signal $TA_M$ becomes high level at the end of the control period Tn. In the control period Tn+1, the time width of the ON period Ton(n+1) is determined by the coincidence detection circuit 55 and based on the final count value FCTon(n).

As stated above, according to embodiment 1, in each of the control periods T1, T2, T3, . . . , the ON period counter 51 counts up the count value CTon in each of the low output sections, and determines the ON period in the next control period based on the final count value FCTon. In embodiment 1, since the count value CTon is counted up in each of the low output sections, as exemplified in FIG. 3(a), the generator output Vg can be raised up to a state where the average Va of the detection voltage Vd is sufficiently close to the reference voltage Vs.

Figure 4:
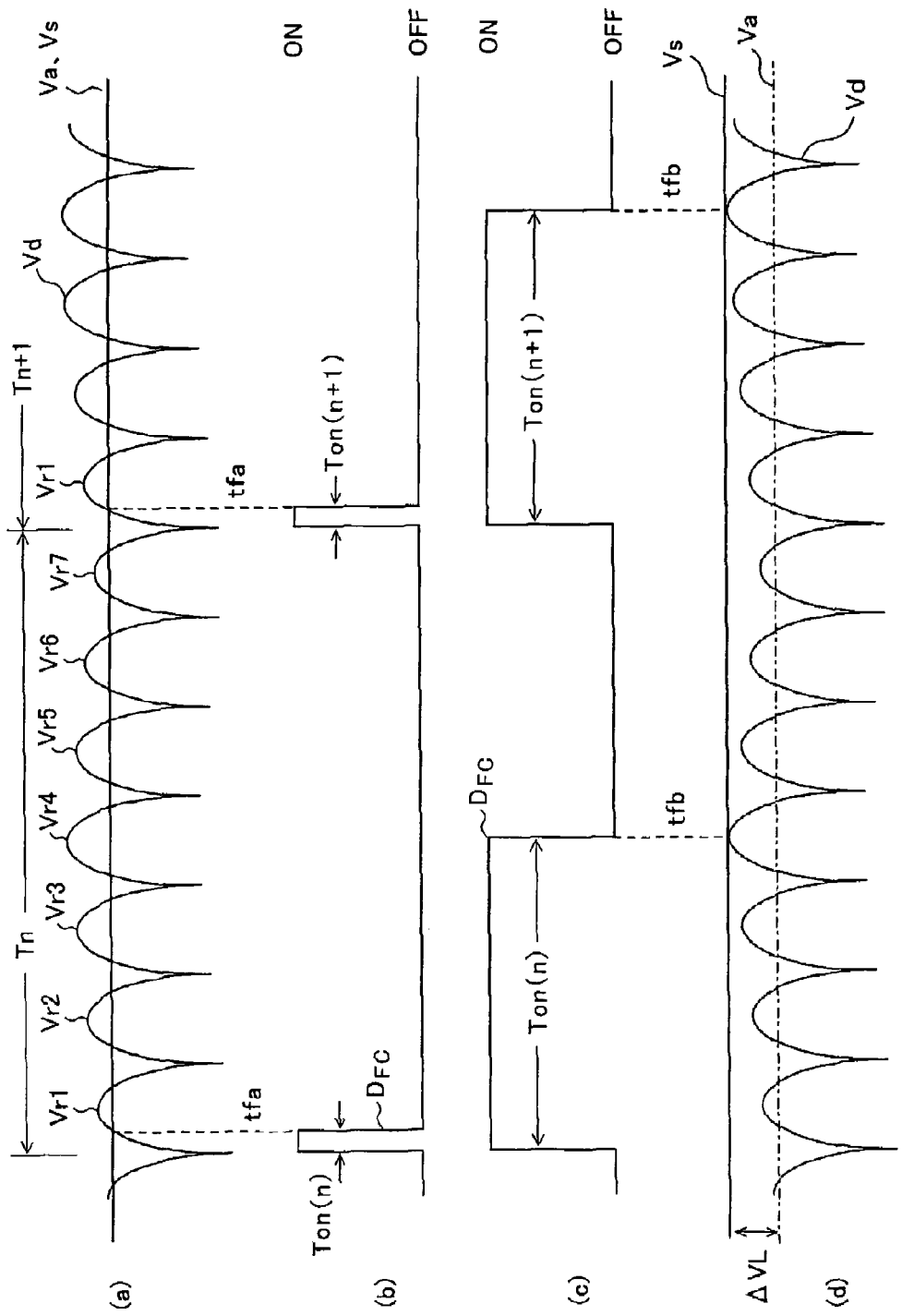
FIGS. 4(a) to 4(d) are waveform views showing an output voltage control operation by a conventional apparatus.

On the other hand, a conventional fixed frequency type output voltage control apparatus is constructed such that the ON period counter 51, the memory circuit 53, and the coincidence detection circuit 55 are not used, and the output "c" of the comparison circuit 43 is directly connected to the reset input R of the flip-flop 31. In the conventional output voltage control apparatus, the determination of the time width of the ON period and the field current control by the time width are performed in one control period. FIGS. 4(a) to 4(d) exemplify operation waveforms of the conventional fixed frequency type output voltage control apparatus. Similarly to FIG. 3(a), FIG. 4(a) shows an ideal state of Va=Vs with respect to two continuous control periods Tn and Tn+1, however, the conventional output voltage control apparatus can not realize the ideal state as stated above. The time widths of the control periods Tn and Tn+1 in FIG. 4(a) are T0 and are equal to each other. In the conventional fixed frequency type control apparatus, when the detection voltage Vd includes the ripple component Vr, since the time widths of the ON periods Ton(n) and Ton(n+1) of the field drive pulse signal $D_{FC}$ are limited as show in FIGS. 4(b) and 4(c), the average value Va of the detection voltage Vd can not be made to sufficiently approach the reference voltage Vs as shown in FIG. 4(d), and an insufficient voltage ΔVL is generated between the average value Va of the detection voltage Vd and the reference voltage Vs.

That is, in the ideal state of Va=Vs of FIG. 4(a), theoretically, as shown in FIG. 4(b), in the control period Tn, Tn+1, the ON period Ton(n), Ton(n+1) is ended at the time point tfa when the first ripple waveform Vr1 exceeds the reference voltage Vs, and the time width of the ON period Ton(n) becomes very short. However, according to this short ON period Ton(n), since the generator output voltage Vg is reduced, the detection voltage Vd is reduced with respect to the reference voltage Vs. Accordingly, actually, as shown in FIG. 4(c), the ON period Ton(n), Ton(n+1) is ended and stabilized at a time point Tfb when the peak value of a ripple waveform Vr4 having the maximum peak value becomes equal to the reference voltage Vs. In the ON period Ton(n), Ton(n+1) of FIG. 4(c), although the field current is increased, the average value Va of the detection voltage Vd has resultantly the insufficient voltage ΔVL with respect to the reference voltage Vs.

Specific voltage values will be exemplified. With respect to the output voltage control apparatus for the 12-volt AC generator 10, in the case where the resistance potential dividing ratio of the voltage detection circuit 41 is ½, and the reference voltage Vs is held at a constant value of 7.0 volts, in the conventional output voltage control apparatus, the average value Va of the detection voltage Vd can be increased only up to 6.7 to 6.8 volts, however, in embodiment 1, it can be increased up to 6.9 volts or higher.

EMBODIMENT 2

Figure 5:
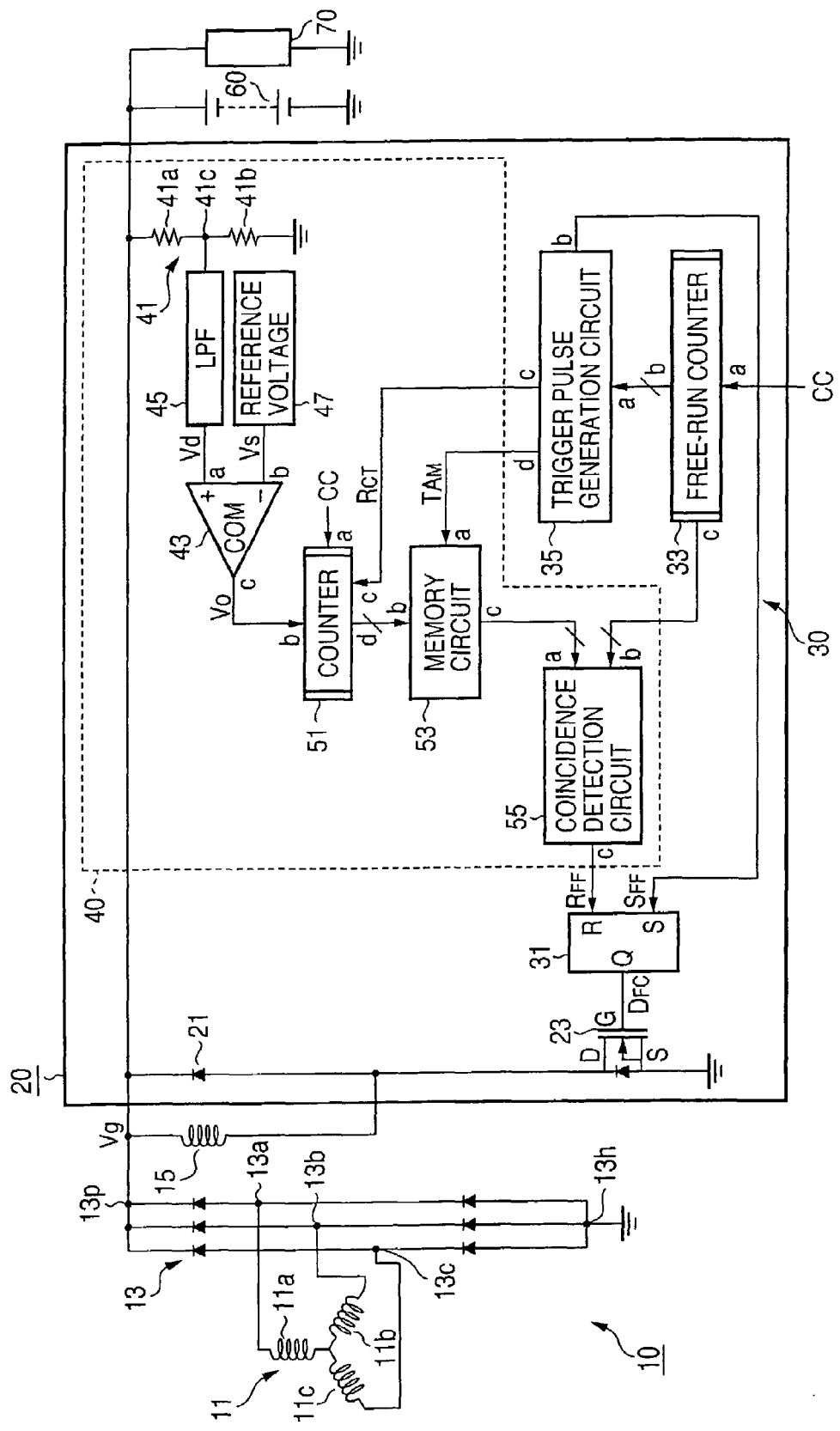
FIG. 5 is an electric circuit diagram showing embodiment 2 of an output voltage control apparatus for a vehicular AC generator according to the invention.

FIG. 5 is an electric circuit diagram showing embodiment 2 of an output voltage control apparatus for a vehicular AC generator according to the invention. In embodiment 2, a low-pass filter 45 is added between an output point 41c of a voltage detection circuit 41 and a plus input "a" of a comparison circuit 43. The others are constructed similarly to embodiment 1.

The low-pass filter 45 includes a resistor and a capacitor, causes a high frequency component to be bypassed, and reduces the amplitude of a ripple component Vr included in a detection voltage Vd. The low-pass filter 45 is effective in reducing the amplitude of the ripple component Vr, and the voltage value of the generator output voltage Vg can be more flattened. However, in order to strengthen the filter performance of the low-pass filter 45, it is necessary to increase the resistance value and the capacitor capacitance value, and in the case where the control unit 30 is constructed of, for example, an integrated circuit, the strengthening of the filter performance is accompanied with the disadvantage that the integrated circuit is enlarged. Thus, there is a limit in the strengthening of the filter performance, and the ripple component Vr remains in a state where the amplitude is reduced.

Also in embodiment 2, since the ON period counter 51, the memory circuit 53, and the coincidence detection circuit 55 function similarly to embodiment 1, also in embodiment 2, the detection voltage Vd can be made to sufficiently approach the reference voltage Vs.

EMBODIMENT 3

In embodiment 3, a reference voltage circuit 47 generates a saw-tooth voltage Vs1 and supplies the saw-tooth voltage Vs1 to a minus input "b" of a comparison circuit 43. The others are constructed similarly to embodiment 1 or embodiment 2. In other words, embodiment 3 is such that in embodiment 1 or 2, the reference voltage Vs is replaced by the saw-tooth voltage Vs1.

Figure 6:
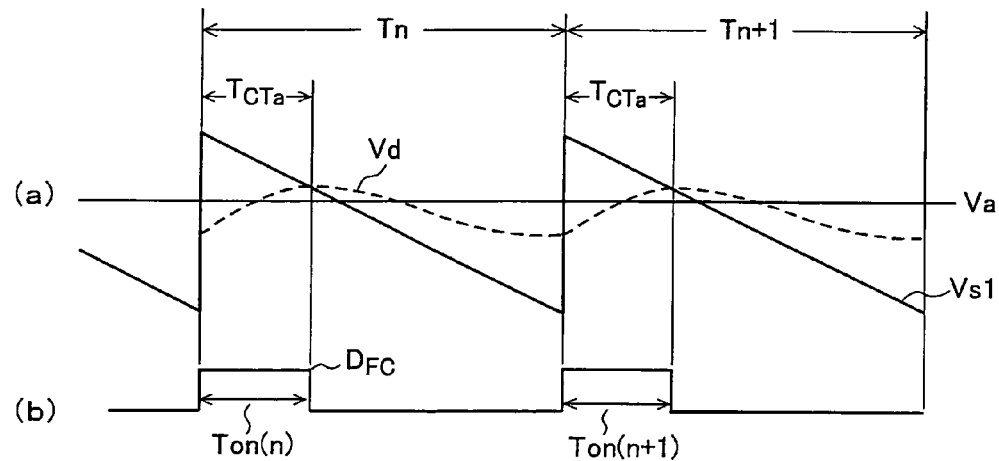

FIG. 6(a) shows the saw-tooth voltage Vs1. Control periods Tn and Tn+1 are two continuous control periods typifying control periods T1, T2, T3, . . . , and n denotes an arbitrary positive integer. The control periods Tn and Tn+1 have the same time width T0. The saw-tooth voltage Vs1 is a triangular voltage changing at the same period as the period T0 of the control periods Tn and Tn+1. The saw-tooth voltage Vs1 linearly decreases from a maximum value Vmax to a minimum value Vmin in each of the control periods Tn and Tn+1. Specifically, for example, in the 12-volt AC generator 10, when the resistance potential dividing ratio of the voltage detection circuit 41 is ½, the maximum value Vmax of the saw-tooth voltage Vs1 is 7.075 volt, the minimum value Vmin is 6.925 volt, and the voltage difference of them is 0.150 volt. FIG. 6(b) shows a field drive pulse signal $D_{FC}$ corresponding to the saw-tooth voltage Vs1. Ton(n) and Ton(n+1) denote ON periods of the control periods Tn and Tn+1.

FIG. 6(a) shows a detection voltage Vd, together with the saw-tooth voltage Vs1, by a dotted line. This detection voltage Vd includes an increase process of increasing at a specified time constant in each of the ON periods Ton(n) and Ton(n+1) of the field drive pulse signal $D_{FC}$, and a decrease process of decreasing at the specified time constant after the end of each of the ON periods Ton(n) and Ton(n+1). In embodiment 3, as shown in FIG. 6(a), in each of the control periods Tn and Tn+1 and in the increase process of the detection voltage Vd, a period $T_{CT}a$ in which the detection voltage Vd is lower than the reference voltage Vs1 becomes a substantial count enable period of the ON period counter 51. Also in embodiment 3, although the ON period counter 51 becomes possible to count in a period in which the counter reset pulse signal $R_{CT}$ shown in FIG. 2(c) becomes low level, a limitation is made to substantially the period $T_{CT}a$ by the use of the saw-tooth voltage Vs1.

Since the saw-tooth voltage Vs1 rises like a saw-tooth wave in the first portion of each of the control periods Tn and Tn+1, the detection voltage Vd becomes certainly lower than the reference voltage Vs1 in the count enable period $T_{CT}a$, and the count enable period $T_{CT}a$ can be certainly ensured. In the count enable period $T_{CT}a$, plural low output sections TL1, TL2, TL3 . . . Similar to FIG. 3(a) are generated due to the ripple component Vr, and the ON period counter 51 counts up the count value CTon in these low output sections and performs the ON period control similar to embodiment 1.

As in embodiment 1, in the case where the reference voltage Vs held at the specified value is used, for example, when engine speed pulsates and the generator output voltage Vg pulsates, the ON period Ton is abruptly changed in accordance with that, and there is a fear that disappearance of the ON period Ton and appearance of the ON period are repeated. However, in embodiment 3, even if the generator output voltage Vg slightly pulsates, since the ON period can be certainly ensured in the count enable period $T_{CT}a$, it becomes possible to more stably control the output voltage.

EMBODIMENT 4

Embodiment 4 is such that a reference voltage circuit 47 generates a saw-tooth voltage Vs2 having a period of 1/m (m is a positive integer of 2 or more) of a time width T0 of each of control periods Tn and Tn+1, and the saw-tooth voltage Vs2 is supplied to a minus input "b" of a comparison circuit 43. The others are constructed similarly to embodiment 1 or embodiment 2. In other words, embodiment 4 is such that in embodiment 1 or 2, the reference voltage Vs is replaced by the saw-tooth voltage Vs2.

Figure 7:
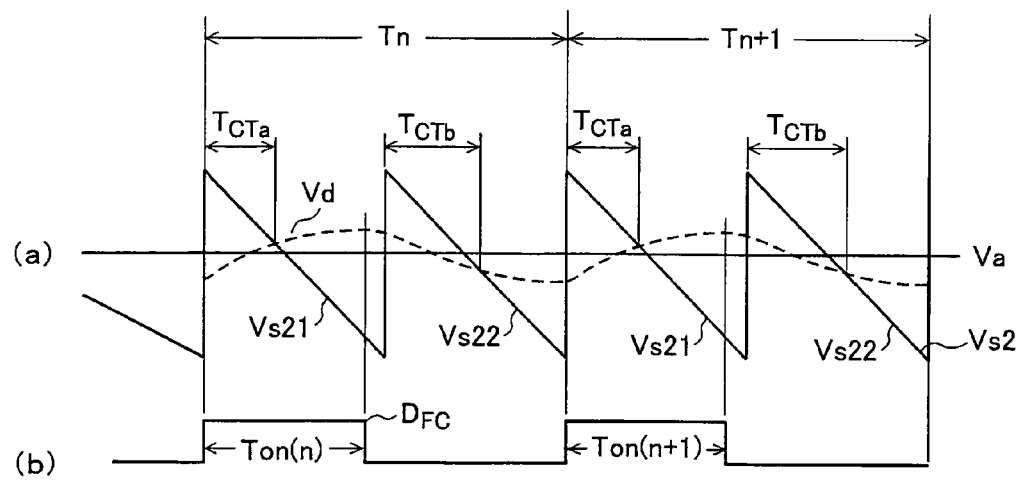

FIG. 7(a) shows the saw-tooth voltage Vs2. The saw-tooth voltage Vs2 specifically has a period (m=2) of ½ of the time width T0 of each of the control periods Tn and Tn+1, changes at two cycles of a first cycle Vs21 and a second cycle Vs22 in each of the control periods Tn and Tn+1, and is linearly changed from a maximum value Vmax to a minimum value Vmin in each of the cycles Vs21 and Vs22. Specifically, in a 12-volt AC generator 10, when a resistance potential dividing ratio of a voltage detection circuit 41 is ½, the maximum value Vmax of the saw-tooth voltage Vs2 is 7.075 volts, the minimum value Vmin is 6.925 volts, and a voltage difference of those is 0.150 volts. FIG. 7(b) shows a field drive pulse signal $D_{FC}$ corresponding to the saw-tooth voltage Vs2.

Similarly to FIG. 6(a), FIG. 7(a) shows the change of a detection voltage Vd by a dotted line. The change of the detection voltage Vd includes an increase process of gradual increase at a specified time constant, corresponding to the ON period Ton(n), Ton(n+1), and a decrease process of gradual decrease at the specified time constant after the ON period Ton(n), Ton(n+1) is ended. The increase process of the detection voltage Vd exists in the first cycle Vs21 of the reference voltage Vs2, and in this first cycle Vs21, a period $T_{CT}a$ in which the detection voltage Vd is lower than the reference voltage Vs2 becomes the count enable period of the ON period counter 51. The decrease process of the detection voltage Vd exists in the second cycle Vs22 of the reference voltage Vs2, and in the second cycle Vs22, a period $T_{CT}b$ in which the detection voltage Vd is lower than the reference voltage Vs2 becomes the count enable period of the ON period counter 51.

Also in embodiment 4, since the reference voltage Vs2 rises like a saw-tooth wave in the first portion of each of the first cycle Vs21 and the second cycle Vs22 of each of the control periods Tn and Tn+1, the detection voltage Vd becomes certainly lower than the reference voltage Vs2 in the count enable periods $T_{CT}a$ and $T_{CT}b$, and the ON periods Ton(n) and Ton(n+1) can be more certainly ensured. In the count enable periods $T_{CT}a$ and $T_{CT}b$, plural low output sections TL1, TL2, TL3 . . . Similar to FIG. 3(a) occur due to the ripple component Vr, and the ON period counter 51 counts up the count value CTon in these low output sections and performs an ON period control similar to embodiment 1.

In embodiment 4, even if the generator output voltage Vg pulsates, since the ON period can be certainly ensured in the periods $T_{CT}a$ and $T_{CT}b$, similarly to embodiment 3, it becomes possible to more stably control the output voltage.

In addition, in embodiment 4, as compared with embodiment 3, the count enable period $T_{CT}$ of the ON period counter 51 can be made larger in each of the control periods Tn and Tn+1. In embodiment 4, the count enable period $T_{CT}$ of the ON period counter 51 in each of the control periods Tn and Tn+1 becomes $T_{CT}=T_{CT}a+T_{CT}b$, and it becomes larger than the count enable period $T_{CT}a$ of embodiment 3. Accordingly, in embodiment 4, the counter enable period $T_{CT}$ of the ON period counter 51 is made larger than that of embodiment 3, the larger ON periods Ton(n) and Ton(n+1) are ensured, and more stable control becomes possible.

The output voltage control apparatus for the vehicular AC generator according to the invention can be applied as an output voltage control apparatus for an AC generator mounted in various vehicles such as an automobile.

What is claimed is:

1. An output voltage control apparatus for a vehicular AC generator having a rectifier unit that rectifies an AC output voltage and outputs a generator output voltage including a ripple component, the output voltage control apparatus comprising:
    a control unit that repeats a control period of a specified time width, and performs a control to supply a field current to the vehicular AC generator on an ON period of a controlled time width in each of the control periods,
    wherein the control unit includes:
    a voltage detection circuit to detect the generator output voltage and to output a detection voltage including a ripple component;
    a comparison circuit to compare the detection voltage including the ripple component with a reference voltage and to output an effective comparison output in each of low output sections in which the detection voltage is lower than the reference voltage depends on the ripple component;
    an ON period counter to count up, in a count enable period set in each of the control periods, a count value while adding the count value in each of the low output sections based on the effective comparison output; and
    a memory circuit to store a final count value in the count enable period in each of the control periods, and
    the control unit determines, based on the final count value in each of the control periods, the ON period of the controlled time width in the next control period.

2. The output voltage control apparatus for the vehicular AC generator according to claim 1, wherein the ON period counter has a clock input to which a clock signal is inputted, a count up permission input to which the effective comparison output is inputted, and a reset input to which a reset pulse is inputted, and the count enable period is set between two adjacent reset pulses.

3. The output voltage control apparatus for the vehicular AC generator according to claim 2, wherein
the memory circuit has a count input to receive the count value from the ON period counter, and a transfer permission input to which a transfer permission pulse is inputted before the reset pulse is inputted to the on period counter, and
the memory circuit reads the final count value based on the transfer permission pulse and stores the final count value.

4. The output voltage control apparatus for the vehicular AC generator according to claim 1, wherein
the control unit further includes a flip-flop to control the ON period, and
the flip-flop starts the ON period at a start time point of each of the control periods, and ends the ON period based on the final count value stored in the memory circuit.

5. The output voltage control apparatus for the vehicular AC generator according to claim 4, wherein the control unit further includes:
a free-run counter that is reset at the start time point of the control period and counts up a count value in each of the control periods; and
a coincidence detection circuit connected between the memory circuit and the flip-flop, and
wherein the coincidence detection circuit ends the ON period by the flip-flop when the count value of the free-run counter is coincident with the final count value.

6. The output voltage control apparatus for the vehicular AC generator according to claim 1, wherein the control unit includes a low-pass filter connected between the voltage detection circuit and the comparison circuit.

7. The output voltage control apparatus for the vehicular AC generator according to claim 1, wherein the reference voltage is supplied as a saw-tooth voltage to the comparison circuit.

8. The output voltage control apparatus for the vehicular AC generator according to claim 1, wherein when a time width of each of the control periods is T0, the reference voltage is periodically changed at a period of T0/m (m is a positive integer of 2 or more).

* * * * *